United States Patent [19]

Froes

[11] Patent Number: 5,235,853

[45] Date of Patent: Aug. 17, 1993

[54] MONOBLOC MOLD FOR ENGRAVING PRESSED GLASS CONTAINERS

[75] Inventor: Marilia Cruz B. Froes, Sao Paulo, Brazil

[73] Assignee: Companhia Vidraria Santa Marina, Sao Paulo, Brazil

[21] Appl. No.: 888,961

[22] Filed: May 26, 1992

[30] Foreign Application Priority Data

Jun. 3, 1991 [BR] Brazil ................ 9102268

[51] Int. Cl.⁵ .................. C03B 11/06; G01F 19/00
[52] U.S. Cl. ............................. 73/427; 65/66; 65/68; 116/201; 249/53 R
[58] Field of Search ............. 73/427; 65/66, 68; 249/53 R; 116/201

[56] References Cited

U.S. PATENT DOCUMENTS

| | | | |
|---|---|---|---|
| 1,412,169 | 4/1922 | Creel | 73/427 |
| 2,372,872 | 4/1945 | Wolper | 73/427 X |
| 2,389,530 | 11/1945 | Miner | 249/53 X |
| 2,514,744 | 7/1950 | Cipyak | 73/427 X |
| 2,726,549 | 12/1955 | Geffen | 73/427 X |
| 2,931,230 | 4/1960 | Lowery | 73/427 |
| 4,522,768 | 6/1985 | Roscrow et al. | 249/53 X |

Primary Examiner—Daniel M. Yasich

[57] ABSTRACT

A monobloc mold for making pressed glass containers having engraved volumetric indications has corresponding male and female die portions. The female die is engraved in the lateral wall with volumetric indications and is engraved in the bottom wall with specifications relative to the volumetric indications. The volumetric indications comprise at least one series of horizontal lines and a symbol corresponding to each series, and the specifications comprise for each series the corresponding symbol and a verbal description of the information revealed by the volumetric indications, so that the indications and specifications are imparted to a glass container formed by pressing in the mold.

2 Claims, 5 Drawing Sheets

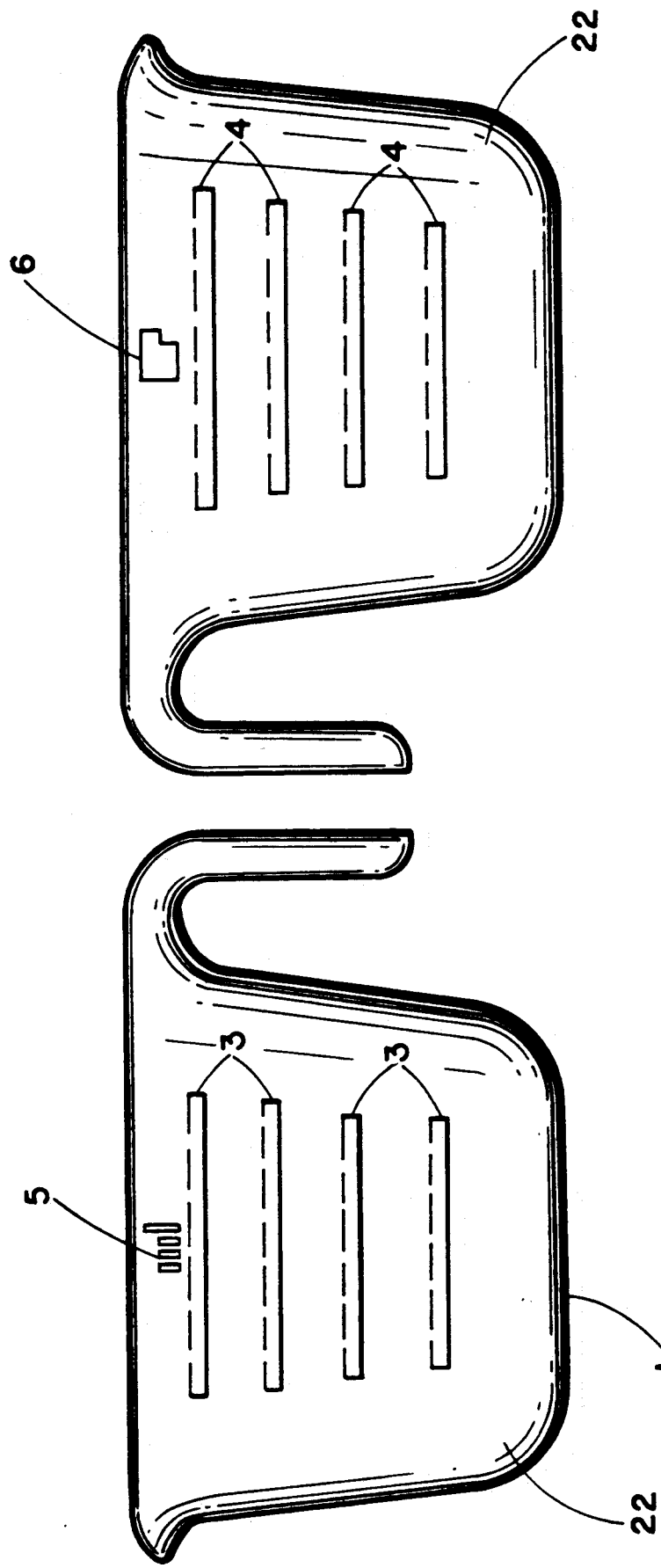

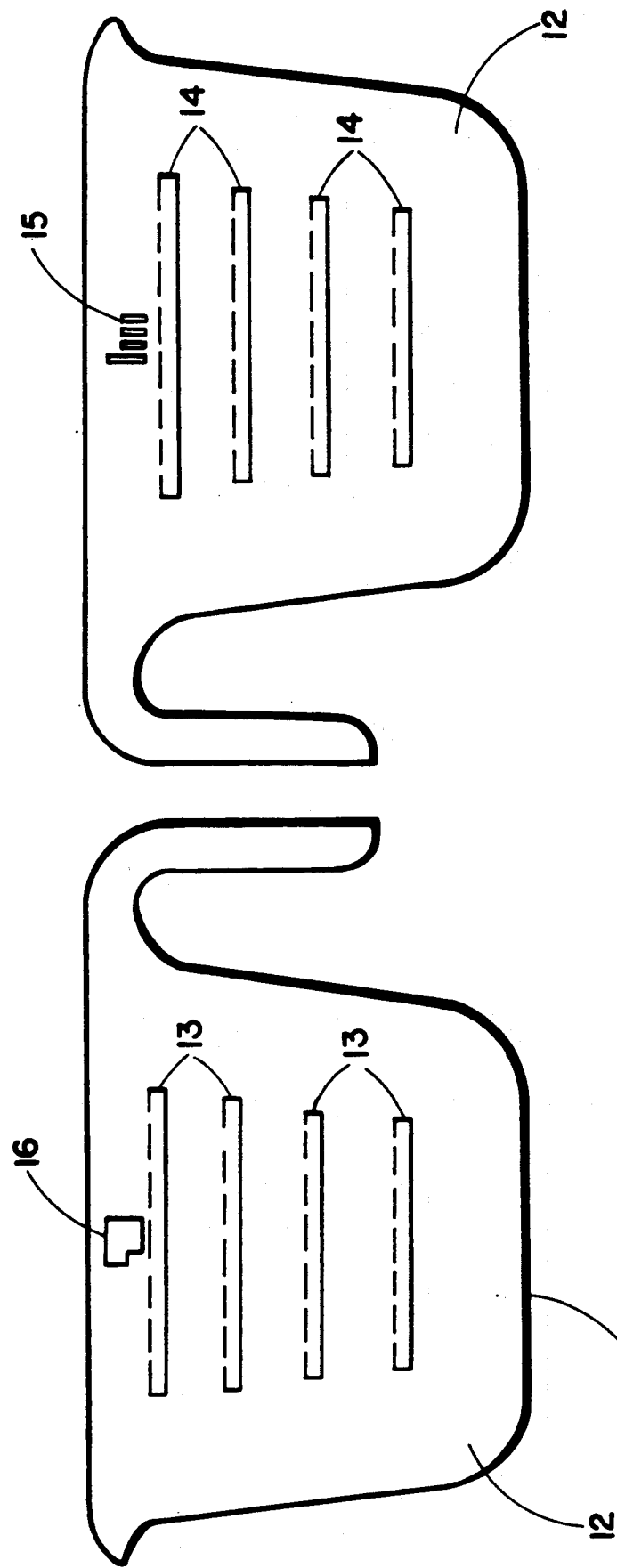

MONOBLOC MOLD FOR ENGRAVING PRESSED GLASS CONTAINERS

This invention is related to a method for engraving, in a monobloc or closed mold, to indicate volumetric graduation in glass parts, such as vessels and other containers obtained by pressing. The improved method of providing for these engraved indications relative to volume of the product or substance contained within the pressed glass containers, has real practical and economical advantages in the production of such pressed glass parts, mainly those used for sundry purposes in kitchens. In particular, the present invention contemplates the engraving of the specifications on the walls of the mold, so that the specifications are transferred to the walls of the glass vessel during pressing.

This new method for engraving volumetric specifications in glass containers and other parts, obtained by pressing in a closed (monobloc) mold having the specifications correspondingly engraved in the walls thereof, advantageously replaces other known graduation processes. One example of such a process is that which uses silk screen engraving, which requires a complementary annealing of the glass to bake the paint. That method which, besides substantially increasing the cost of production of glass parts, has been avoided in products destined for foodstuff, due to the toxic characteristics of the paint. Another existing process is a gradual engraving system achieved through an "open mold", where the operational complexity of the mold itself and the low yield, produce unfavorable results relative to the costs of the product.

The new method to engrave pressed glass parts, by the use of closed (monobloc) mold having correspondingly engraved walls, solves the previously technically impossible engraving of volumetric graduation in pressed glass parts, mainly dosing containers, by means of a very ingenious method. This method consists, substantially, in engraving the bottom wall, in the inner face of the mold, the specification or words corresponding to the volume of the glass part to be pressed, in ml (milliliters), cups, oz., etc. There is a further engraving, on the lateral inner all of the mold, such as horizontal lines or marks, in sequence, in echelon manner, with such lines corresponding to the indications engraved on the bottom wall of the mold. The specifications and lines are transferred respectively to the bottom wall and the lateral wall of the glass part. The user may then determine the values of the marks identifying the measures shown by the horizontal lines engraved on the lateral wall by referring to the specifications visible o the bottom of the glass part.

FIG. 1 is a lateral outside view of an embodiment of a pressed glass container made using the method of the invention;

FIG. 2 is a lateral outside view of the opposite side of the container of FIG. 1;

FIG. 5 is a side view of the lateral wall of the mold die as seen from line 5—5 of FIG. 4;

FIG. 6 is a side view of the lateral wall of the mold die as seen from line 6—6 of FIG. 4;

Figure 3:
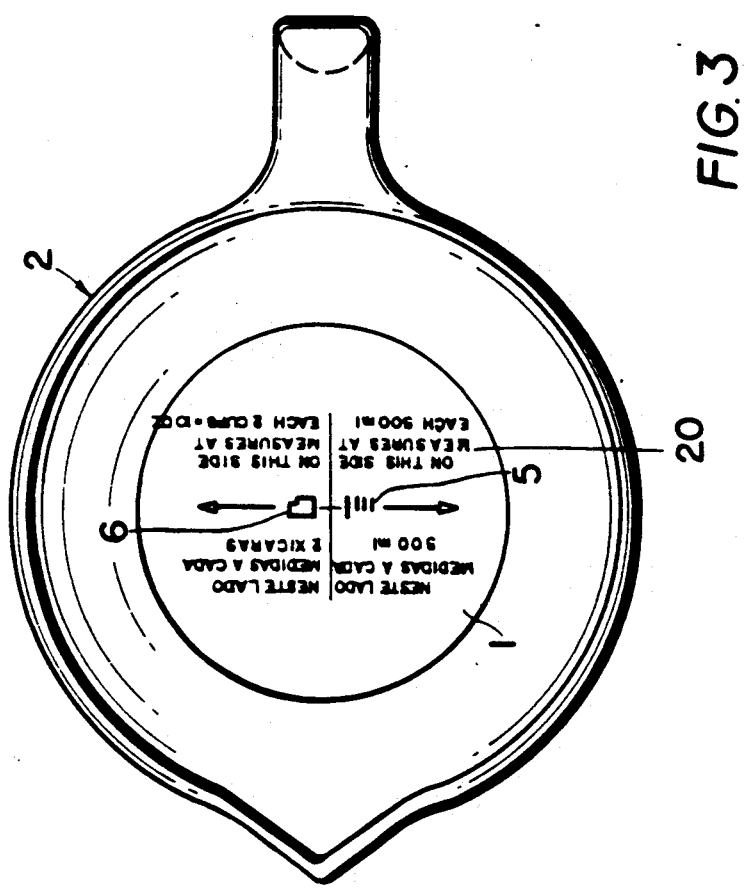
FIG. 3 is a top view of the container of FIG. 1.
Figure 4:
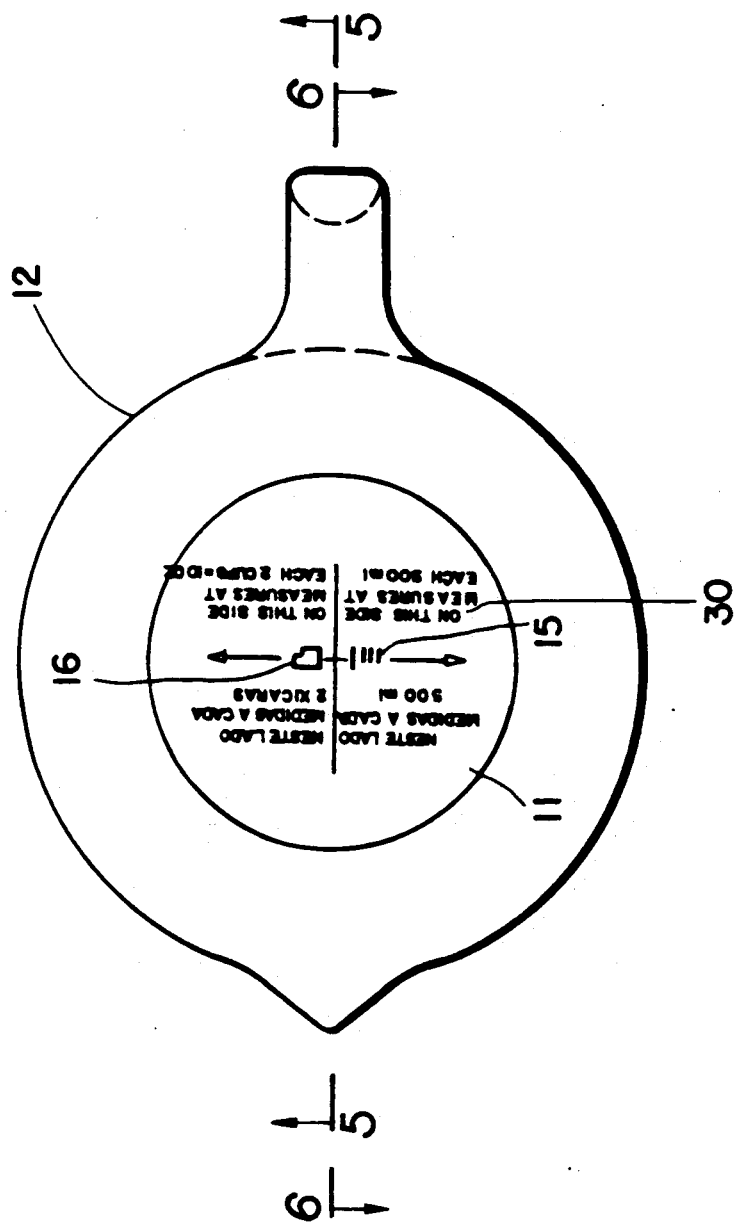
FIG. 4 is a top view of the bottom inside wall of the female die of a mold used to produce the container of FIGS. 1-3.
Figure 7:
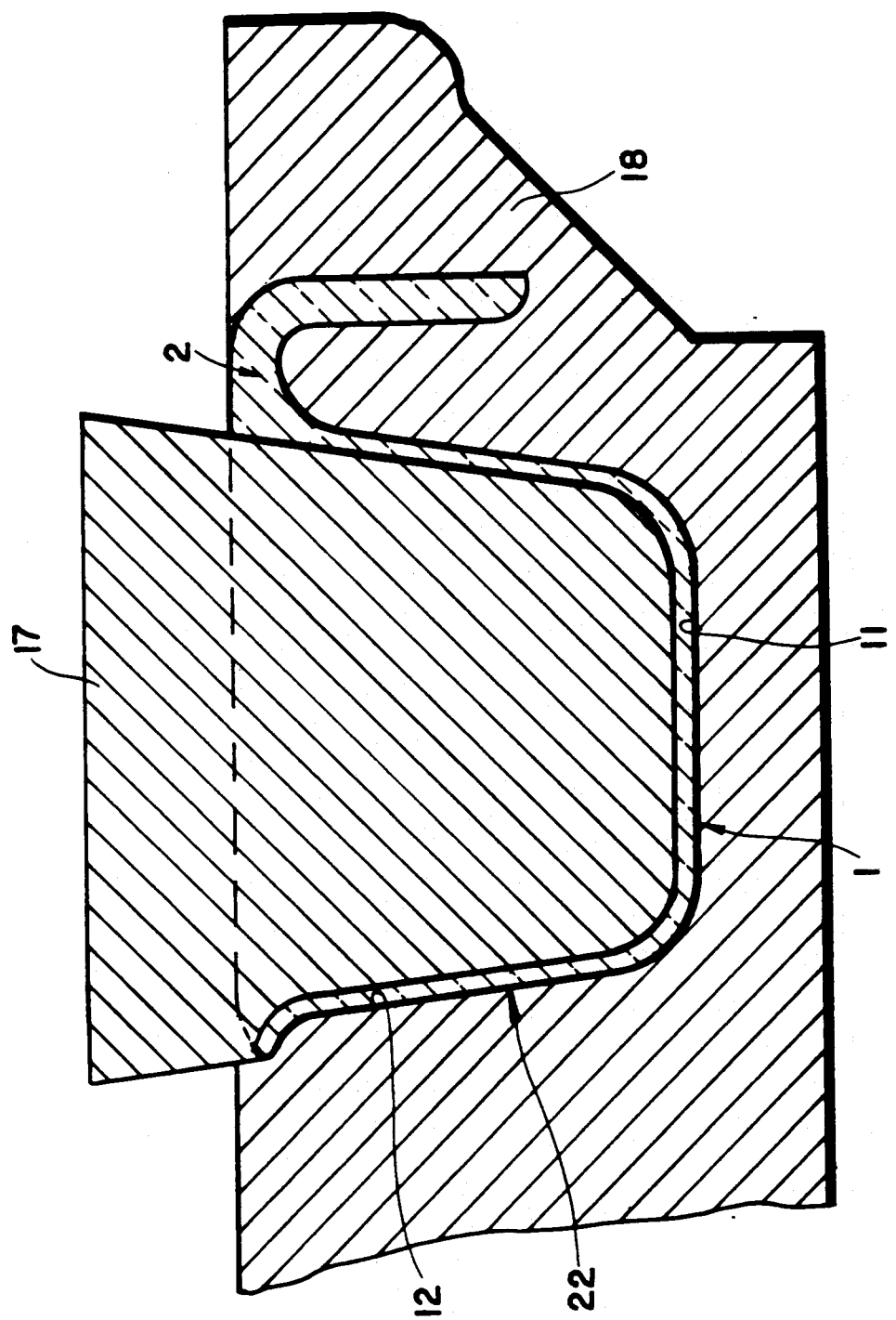
FIG. 7 is cross-sectional side view of the male and female die portions of the mold having pressed glass container therebetween.

Now will be described in further detail the new method for engraving in monobloc or closed mold for specifying volumetric graduation in pressed glass parts. With reference to FIGS. 4 and 7, the bottom wall 11 of the female die portion 18 of the mold has engraved therein the words of specifications 30 relative to the graduation values 3,4 corresponding to the container or part to be pressed (as shown in FIGS. 1,2), with such graduations being engraved in intervals of ml (milliliters), cups, oz., etc. Upon pressing between the male 17 and female 18 die portions of the mold, as shown in FIG. 7, the specifications 30 are transferred as reference numeral 20 to the bottom outside wall 1, of the glass container 2, as seen in FIG. 3.

With reference to FIGS. 5-7, on the lateral walls 12 of the female die portion 18 of the monobloc mold, horizontal lines or marks 13,14 are engraved, in echelon, which correspond, in each of the opposite sides of the mold, to the volumetric graduation specifications 30 indicated by the respective symbols (16,15 cups or ml) on the bottom wall 11 of the mold. The horizontal lines 13,14 and the respective symbols 16,15 are transferred to the lateral outside wall 12 of the container resulting from the pressing operation shown in FIG. 7.

The bottom 11 of the mold 18 transfers to the bottom 1 of a glass container 2 specifications 20 relative to each series of horizontals 3,4, along with the symbol 5,6 corresponding to each set. This novel method of providing for engraved information on a glass container allows for simple sets of graduations around the perimeter of a container. Each set is denoted by a symbol. The user of the container may then refer to the bottom of the container, notice the symbol corresponding to a certain set of graduations, and learn about the nature of that set by reading the corresponding specifications. Thus, with the claimed method providing a novel arrangement of engraved information, a number of sets of graduations may be employed, each using a different volumetric indication, such as ounces or milliliters, and each being graduated at a certain interval. The present invention allows for more specific information as to the nature of volumetric indication to be provided for easy reference at the bottom of the container, thus producing a glass container which is easy to use under various volumetric conditions.

The new method for engraving gradual and volumetric specifications in containers and other pressed glass parts obtained in closed or monobloc molds allows for a great simplification and acceleration of the production of pressed parts, and provides for a perfect engraving, with a cost substantially lower than that of engravings obtained by the known processes and methods. This new method is quite important for containers used for dosing foodstuff, replacing those engraved by silk screen process, which require the use of paints.

I claim:

1. A method for making pressed glass containers having engraved volumetric indications thereon, comprising the steps of:

(a) providing a monobloc mold for pressing said glass part, the mold having corresponding male and female die portions, the female die having engraved in the lateral will thereof volumetric indications and having engraved in the bottom wall thereof specifications relative to said volumetric indications, wherein the volumetric indications comprise at least one series of horizontal lines and a symbol corresponding to each series, and the specifications comprise for each series the corresponding symbol and verbal description of the information revealed by said volumetric indications; and (b) pressing glass between said male and female die portions to produce a glass container having the volumetric indications transferred to the outside side wall of the glass container and the specifications transferred to the outside bottom wall of the container.

2. A monobloc mold for making pressed glass containers having engraved volumetric indications thereon, the mold comprising corresponding male and female die portions, the female die having engraved in the lateral wall thereof volumetric indications and having engraved in the bottom wall thereof specifications relative to said volumetric indications, wherein the volumetric indications comprise at least one series of horizontal lines and a symbol corresponding to each series, and the specifications comprise for each series the corresponding symbol and a verbal description of the information revealed by said volumetric indications, so that said indications and specifications are imparted to a glass container by pressing in said mold.

* * * * *